(12) United States Patent
Mao et al.

(10) Patent No.: US 12,116,727 B2
(45) Date of Patent: Oct. 15, 2024

(54) DIGITAL CONTROL METHOD AND SYSTEM THEREOF FOR SOLUTION REPLENISHMENT SYSTEM IN THE PAD DYEING PROCESS WITH COMBINATION DYES

(71) Applicant: DONGHUA UNIVERSITY, Shanghai (CN)

(72) Inventors: Zhiping Mao, Shanghai (CN); Yamin Dai, Shanghai (CN); Hong Xu, Shanghai (CN); Yi Zhong, Shanghai (CN); Hui Lu, Shanghai (CN); Linping Zhang, Shanghai (CN); Xiaofeng Sui, Shanghai (CN); Wei Wu, Shanghai (CN)

(73) Assignee: DONGHUA UNIVERSITY, Shanghai (CN)

( * ) Notice: Subject to any disclaimer, the term of this patent is extended or adjusted under 35 U.S.C. 154(b) by 0 days.

(21) Appl. No.: 18/271,242

(22) PCT Filed: Dec. 28, 2021

(86) PCT No.: PCT/CN2021/142029
§ 371 (c)(1),
(2) Date: Jul. 7, 2023

(87) PCT Pub. No.: WO2022/148274
PCT Pub. Date: Jul. 14, 2022

(65) Prior Publication Data
US 2024/0052561 A1 Feb. 15, 2024

(30) Foreign Application Priority Data
Jan. 7, 2021 (CN) .......................... 202110016834.1

(51) Int. Cl.
*D06P 1/00* (2006.01)
*D06P 1/38* (2006.01)
*D06P 3/66* (2006.01)
*G05D 11/13* (2006.01)

(52) U.S. Cl.
CPC .............. *D06P 1/0032* (2013.01); *D06P 1/38* (2013.01); *G05D 11/139* (2013.01); *D06P 3/66* (2013.01)

(58) Field of Classification Search
CPC ............ D06P 1/0032; D06P 1/38; D06P 3/66; G05D 11/139
See application file for complete search history.

(56) References Cited

U.S. PATENT DOCUMENTS 5,846,265 A   12/1998   McGregor et al.

FOREIGN PATENT DOCUMENTS

| CN | 1512003 A | | 7/2004 |
|---|---|---|---|
| CN | 1746805 A | | 3/2006 |
| CN | 107447541 A | | 12/2017 |
| CN | 108411530 A | | 8/2018 |
| CN | 109487575 | * | 3/2019 |
| CN | 109811493 | * | 5/2019 |
| CN | 109811493 A | | 5/2019 |
| CN | 112882502 A | | 6/2021 |

* cited by examiner

*Primary Examiner* — Amina S Khan
(74) *Attorney, Agent, or Firm* — Bayramoglu Law Offices LLC

(57) ABSTRACT

A digital control method is to accurately calculate the real-time addition amount of each dye in the solution replenishment system in the whole dyeing process based on the initial dyeing rate of each dye, and replenish the dye solution according to the real-time addition amount. A digital control system includes an automatic calculation $K_{0,n}$ value unit, a central processing unit and a replenishment pump. The automatic calculation $K_{0,n}$ value unit is composed of a dye solution concentration detection instrument, a sensor I and a BP neural network model. The BP neural network model is a BP neural network trained by a dye database. The automatic calculation $K_{0,n}$ value unit transmits the $K_{0,n}$ value to the central processing unit, calculates the replenishment amount through the central processing unit, and controls the replenishment pump to replenish the solution.

6 Claims, 2 Drawing Sheets

DIGITAL CONTROL METHOD AND SYSTEM THEREOF FOR SOLUTION REPLENISHMENT SYSTEM IN THE PAD DYEING PROCESS WITH COMBINATION DYES

CROSS REFERENCE TO THE RELATED APPLICATIONS

This application is the national phase entry of International Application No. PCT/CN2021/142029, filed on Dec. 28, 2021, which is based upon and claims priority to Chinese Patent Application No. 202110016834.1, filed on Jan. 7, 2021, the entire contents of which are incorporated herein by reference.

TECHNICAL FIELD

The present invention belongs to the technical field of automatic control of printing and dyeing, relates to a digital control method and system thereof for solution replenishment system in the pad dyeing process with combination dyes, and more particularly, relates to a digital control method and control system thereof for solution replenishment system in the pad dyeing process with combination of two or more dyes.

BACKGROUND

In the continuous pad dyeing process with combination of two or more dyes, it is necessary to constantly adjust the solution addition amount of each dye in the solution replenishment system to ensure that the concentration ratio of the dyes in the dye solution tank remains unchanged to obtain the stable coloured light.

At present, dyeing factories mainly have experienced technicians to roughly judge the addition amount of each dye based on experiments such as permeation circles or ratio shift values, and continuously adjust by making small samples to realize the control of the solution replenishment system in actual dyeing experiments. This method depends on the empirical formula to make the concentration in the dye solution tank finally reach dynamic balance through the transition stage, and the concentration in the dye solution tank is inconsistent with the initial concentration at the final balance, which consumes a lot of dyes and fabrics. In the actual scale-up experiment, an approved color prevails, and its formula is used as an original formula for mass production, the original formula naturally becomes the balanced formula after transition, and the color difference will change. The combination of the same group of dyes requires different addition amounts of dye solution under different conditions such as dyed fabrics and dyeing processes, and this method of correcting the solution replenishment system based on experience will lead to difficulties in accurate control of the addition amount of each dye in the solution replenishment system.

Therefore, it is of great significance to study a digital control method and its control system for solution replenishment system in the dyeing process with combination dyes, which is simple in method, accurate in result, wide in dye application range and capable of improving the quality of dyed products.

SUMMARY

Aiming at the defects in the prior art, the present invention provides a digital control method and its control system for solution replenishment system in the dyeing process with combination dyes, which is simple in method, accurate in analysis result, wide in dye application range and capable of improving the quality of dyed products. The present invention aims to solve the technical problem in the prior art that it is difficult to obtain the stable colored light with accurate control, and provides a digital control method and system thereof for solution replenishment system in the pad dyeing process with combination dyes, especially for a digital control method and control system thereof for solution replenishment system in the pad dyeing process with combination of two or more dyes.

To this end, the technical schemes of the invention are as follows:

A digital control method for solution replenishment system in the pad dyeing process with combination dyes, includes that accurately calculating a real-time addition amount of each dye in a solution replenishment system in the whole dyeing process based on an initial dyeing rate $K_{0,n}$ of each dye, and replenishing a dye solution according to the real-time addition amount.

As preferred technical solutions:

The said digital control method for solution replenishment system in the pad dyeing process with combination dyes, wherein the real-time addition amount $m_{r,n}$ (g) of each dye is:

$$m_{r,n} = TX\left[C_n\left(P - \frac{K_{0,1}t}{6\times10^4} - \frac{K_{0,2}t}{6\times10^4} - \ldots - \frac{K_{0,n}t}{6\times10^4}\right)/\rho_0 + \frac{K_{0,n}t}{6\times10^4}\right];$$

wherein $C_n$ is an initial concentration of each dye in the dye solution with unit of g/mL, and n≥2, which is the number of dye types; $K_{0,n}$ is the initial dyeing rate of each dye with unit of mg·g$^{-1}$·min$^{-1}$; $K_{0,1}$ is the initial dyeing rate of a first dye with unit of mg·g$^{-1}$·min$^{-1}$; $K_{0,2}$ is the initial dyeing rate of a second dye with unit of mg·g$^{-1}$·min$^{-1}$; $\rho_0$ is a density of an initial pad dyeing solution with unit of g/mL; P is a solution carrying rate of the fabric with unit of %; t is a time of fabric dipping in the pad dyeing solution with unit of s; T is a time of pad dyeing with unit of min; X is a weight of pad dyeing fabric per unit time with unit of g/min;

wherein the accuracy refers to real-time addition grams of each dye in the quantifiable combination dyes;

wherein the initial dyeing rate of each dye is calculated on the same basis as the conditions of the pad dyeing process, that is, dye types, a concentration and proportion of dye solution, a dyeing temperature, specifications of the dyed fabric, a bath ratio and an addition amount of additives are the same;

wherein the pad dyeing process with combination dyes includes a pad dyeing process of acid dyes, reactive dyes, or direct dyes;

wherein the pad dyeing process with combination dyes refers to a continuous pad dyeing process with combination of more than two dyes;

wherein the pad dyeing process with combination dyes is a process of continuously applying the dye solution to the fabric by a padder, including but not limited to a continuous pad dyeing process, an intermittent pad dyeing process, or a cold pad-batch pad dyeing process;

wherein the initial concentration $C_n$ of the dye solution (that is the ratio of the mass of each dye to the volume of the dye solution) is 0.01-200 g/L; wherein the dyeing temperature is 10-100° C., and the amount of neutral salt in the dye solution (the ratio of the mass of neutral salt to the volume of water) is 0-300 g/L;

wherein the calculation method of the initial dyeing rate $K_{0,n}$ of each dye includes the following steps: through a Raman spectrometer, a spectrophotometer or a liquid chromatograph, detecting changes of the concentration of each dye in a certain formula dye solution along with the dyeing time under certain color combination dyeing conditions, calculating the amount of each dye on a fabric per unit mass according to the concentration of each dye at different dyeing times in the dye solution, drawing a curve graph of the dyeing process, and obtaining a slope of the zero point from the fitted curve graph of the dyeing process as the initial dyeing rate $K_{0,n}$.

A digital control system for solution replenishment system in the pad dyeing process with combination dyes, includes an automatic calculation $K_{0,n}$ value unit, a central processing unit and a replenishment pump; wherein the automatic calculation $K_{0,n}$ value unit transmits the $K_{0,n}$ value to the central processing unit, calculates the replenishment amount through the central processing unit, and controls the replenishment pump to replenish the solution;

wherein the automatic calculation $K_{0,n}$ value unit is composed of a dye solution concentration detection instrument, a sensor I and a BP neural network model; wherein the dye solution concentration detection instrument is the Raman spectrometer, the spectrophotometer or the liquid chromatograph; wherein the BP neural network model is a BP neural network trained by a dye database, and the dye database includes multiple historical dye formulas and the $K_{0,n}$ value of each dye in the dye formula, during training, the amount of each dye on the fabric per unit mass respectively calculated by the concentration of each dye at different dyeing times in each historical dye formula is taken as an input item, and the $K_{0,n}$ value corresponding to the amount of each dye is taken as an output item;

wherein the central processing unit is composed of a sensor II and a calculation processing unit.

The control system specifically includes that, through the Raman spectrometer, the spectrophotometer or the liquid chromatograph, detecting changes of the concentration of each dye in a certain formula dye solution along with the dyeing time under certain color combination dyeing conditions, calculating the amount of each dye on the fabric per unit mass according to the concentration of each dye at different dyeing times in the dye solution, and simultaneously inputting into the same neural network model, which outputs the initial dyeing rate $K_{0,n}$ of each dye. The dyeing condition and the dye formula are changed respectively, and according to changes of the concentration of each dye corresponding to each dye in the dye solutions of different dyeing conditions and dye formulas along with the dyeing time, the ratios of the amount of each dye on the fabric to the total mass of the fabric at different dyeing times are calculated, and the corresponding initial dyeing rate $K_{0,n}$ of each dye is used to train the neural network. The ratios of the amount of each dye adsorbed to the fabric at different dyeing times to the total mass of the fabric under certain dyeing conditions and certain dye formulas are input into the trained neural network, which automatically outputs the initial dyeing rate $K_{0,n}$ of each dye. The $K_{0,n}$ value is transmitted from the sensor to the central processing unit, and the real-time addition amount $m_{r,n}$ of each dye is calculated by the calculation formula in the digital control method of the solution replenishment system in the calculation processing unit, and finally, the addition amount of each dye is accurately controlled by the replenishment pump.

The reasoning process of the calculation method of the real-time addition amount $m_{r,n}$ (g) of each dye is as follows:

The digital control method for solution replenishment system in the pad dyeing process with combination dyes, during the color combination pad dyeing process, the time of fabric dipping in the dye solution is only 4-6 s, in this very short initial dyeing time, the concentration difference between the inside and the outside of the fiber is large, and the dyeing rate $K_{0,n}$ of each dye remains unchanged. If the time of the fabric dipping the dye solution in the pad dyeing tank is t (s), then the amount of the dye $m_{t,n}$ (mg·g$^{-1}$) adsorbed to the fabric per unit gram at t (s) is:

$$m_{t,n} = \frac{t}{60} \times K_{0,n} \quad (1)$$

in the formula: wherein $K_{0,n}$ is the initial dyeing rate of the n th (n≥1) dye in the dyeing process with unit of mg·g$^{-1}$·min$^{-1}$;

in the pad dyeing process, if the weight of the dyed fabric per unit time is X (g/min), after dyeing for T (min) time, the amount of the dye $m_{T,n}$ (g) adsorbed to the fabric through the affinity effect with the fiber is:

$$m_{T,n} = m_{t,n} \times T \times X \quad (2)$$

combining formulas (1) and (2) can obtain:

$$m_{T,n} = \frac{K_{0,n} t}{6 \times 10^4} \times TX \quad (3)$$

from the above, it can be seen that the amount of the dye adsorbed to the fabric through the affinity effect with the fiber needs to be additionally added in the dye solution tank after dyeing for T (min) time, in addition to dyes added to the fabric for pad dyeing.

In the pad dyeing process, if the solution carrying rate of the fabric is P (%), the initial concentration of each dye in the dye solution tank is respectively $C_1, C_2, \ldots C_n$ (g/mL), and n≥2, then after dyeing for T (min) time, according to the mass conservation before and after pad dyeing can obtain:

$$TXP = \rho_0 \times L_p + (m_{T,1} + m_{T,2} + \ldots + m_{T,n}) \quad (4)$$

then:

$$L_p = \left[TXP - TX\left(\frac{K_{0,1} t}{6 \times 10^4} + \frac{K_{0,2} t}{6 \times 10^4} + \ldots + \frac{K_{0,n} t}{6 \times 10^4}\right)\right]/\rho_0 \quad (5)$$

in the formula: wherein $\rho_0$ is the density of the initial pad dyeing solution with unit of g/mL; $L_p$ is the volume of the dye solution rolled onto the fabric through pad dyeing with unit of mL, and $L_r$ is the volume of the replenishment solution with unit of mL (according to the volume conservation: $L_r = L_p$).

The amount of the dye $m_{p,n}$ (g) rolled onto the fabric by the roller can be obtained from the formula (5):

$$m_{P,n} = L_P \times C_n \quad (6)$$

that is:

$$m_{P,n} = c_n \left[ TXP - TX \left( \frac{K_{0,1}t}{6 \times 10^4} + \frac{K_{0,2}t}{6 \times 10^4} + \ldots + \frac{K_{0,n}t}{6 \times 10^4} \right) \right] / \rho_0 \quad (7)$$

from the above, the amount of each dye $m_{p,n}$ rolled onto the fabric through pad dyeing can be seen after dyeing for T (min) time.

According to the mass conservation of each dye: $m_{r,n} = m_{p,n} + m_{T,n}$, combining formulas (3) and (7) can obtain:

$$m_{r,n} = TX \left[ C_n \left( P - \frac{K_{0,1}t}{6 \times 10^4} - \frac{K_{0,2}t}{6 \times 10^4} - \ldots - \frac{K_{0,n}t}{6 \times 10^4} \right) / \rho_0 + \frac{K_{0,n}t}{6 \times 10^4} \right] \quad (8)$$

in the formula: $m_{r,n}$ is the mass of the n th component dye that needs to be added after dyeing for T (min) time with unit of g; $m_{p,n}$ is the mass of the n th component dye that rolled onto the fabric by the roller after dyeing for T (min) time with unit of g. In the formula, the dyeing process conditions of the dyeing rate curve for calculating the initial dyeing rate $K_{0,n}$ of each dye need to be consistent with the pad dyeing process conditions, that is, the dye types, the concentration and proportion of dye solution, the dyeing temperature, the specification of the dyed fabric and other dyeing conditions are the same. It can accurately calculate the real-time addition amount of each dye in the solution replenishment system in the whole dyeing process, and achieve the purpose of digitally controlling the solution replenishment system.

The principle of the invention is as follows:

According to the initial dyeing rate of each dye in color combination dyeing under certain dyeing conditions, the present invention quantifies the amount of the dye absorbed to the fabric by each dye through the affinity effect with the fiber at a certain pad dyeing time; then the amount of the dye rolled onto the fabric by the roller at a certain pad dyeing time can be seen through the solution carrying rate, according to the mass conservation of each dye, the amount of each dye that needs to be added after a certain pad dyeing time is the sum of the amount of the dye absorbed to the fabric through the affinity effect with the fiber and the amount of the dye rolled onto the fabric by the roller. According to the total amount of the dye solution rolled onto the fabric, the volume of the dye solution rolled onto the fabric is calculated as the volume of the dye solution that needs to be added, so that the concentration of each dye that needs to be added can be obtained.

Benefits (1) The digital control method for solution replenishment system in the pad dyeing process with combination dyes of the present invention can accurately calculate the replenishment amount of the dye solution, realize the digital control of the replenishment system;

(2) The digital control method for solution replenishment system in the pad dyeing process with combination dyes of the present invention, is simple in method and accurate in result, is convenient to realize the accurate control of the solution replenishment system in the dyeing process, improves theoretical technical support in order to improve the quality of dyed products, and has great application prospects;

(3) The digital control system for solution replenishment system in the pad dyeing process with combination dyes of the present invention, converts variables such as the initial concentration of the dye, the initial proportion of the dye solution, the dyeing temperature, and the amount of additives into controllable variables with the initial dyeing rate $K_{0,n}$ as the specific value through the neural network, calculates the real-time addition amount of each dye by the central processing unit, and controls the replenishment pump to perform accurate replenishment, realizing the conversion of the replenishment system from human experience control to digital control.

wherein the original solution refers to the experimental result after replenishing at the concentration of the original dye solution, and the replenishment solution refers to the experimental result after replenishing at the concentration of the replenishment solution.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, those technical personnel in this field can make various changes or modifications to the invention, and these equivalent forms also fall within the scope of the claims attached to the application.

Example 1

Figure 1:
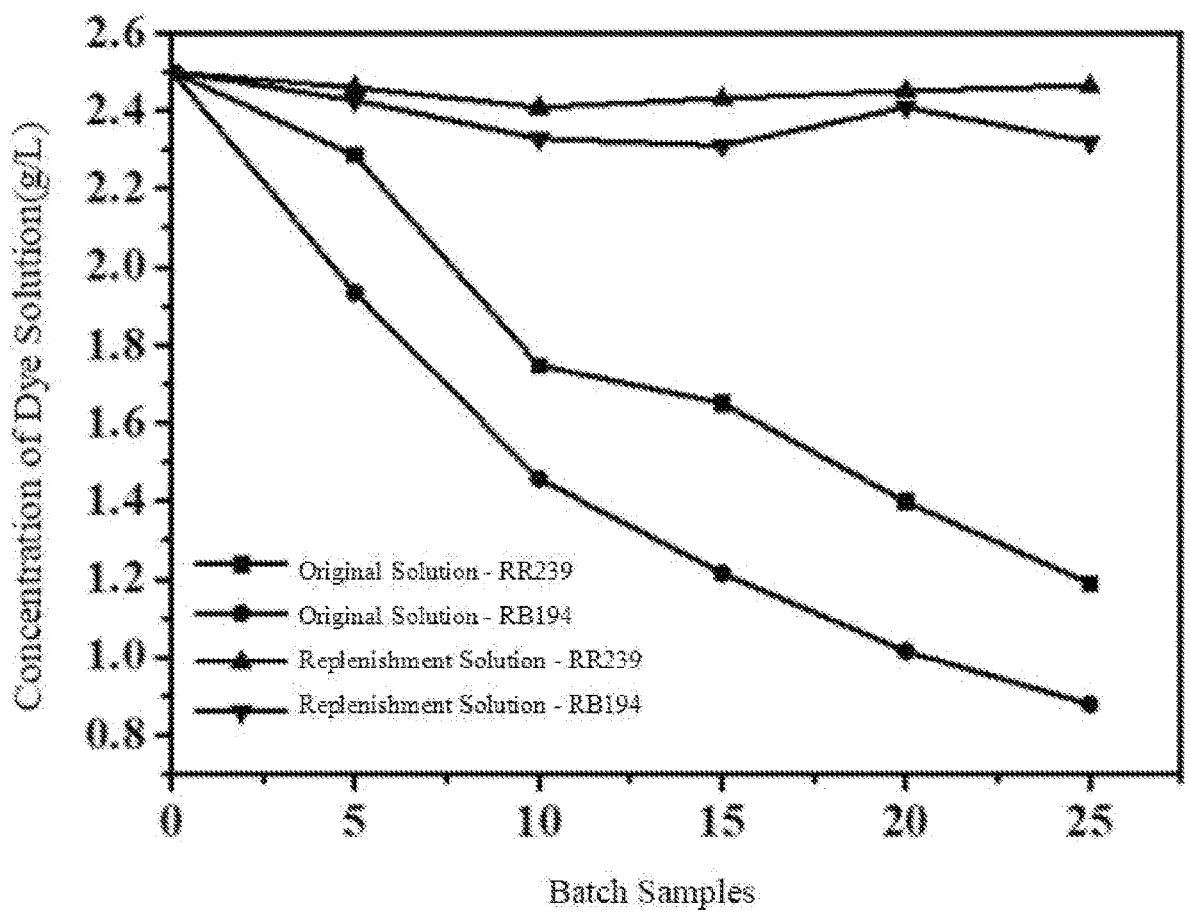
FIG. 1 is a comparison graph of the change in the concentration of each dye in Example 1 between the original dye solution and the dye solution after calculating the concentration of the replenishment solution.

A digital control method for solution replenishment system in the pad dyeing process with combination dyes, is calculating the real-time addition amount $K_{0,n}$ of each dye in the solution replenishment system in the whole dyeing process based on the initial dyeing rate of each dye, that is the real-time addition gram of each dye, and replenishing the dye solution according to the real-time addition gram; the specific processes are as follows:

(1) cut the cotton fabric into a number of cloth pieces with the same length and width of 3 g, prepare 5 g/L of mixed dye solution of Reactive Red 3BE and Reactive Blue M-2G mixed dye solution (with mass ratio of 1:1) and 60 g/L of sodium sulfate, place the cotton fabric in the mixed dye solution for color combination dyeing, control the bath ratio of 1:25, and the dyeing temperature of 40° C.;

(2) calculate the initial dyeing rate $K_{0,n}$ of each dye: through a Raman spectrometer, a spectrophotometer or a liquid chromatograph, detecting changes of the concentration of each dye in a certain formula dye solution along with the dyeing time under certain color combination dyeing conditions, calculating the amount of each dye on a fabric per unit mass according to the concentration of each dye at different dyeing times in the dye solution, drawing a curve graph of the dyeing process, and obtaining a slope of the zero point from the fitted curve graph of the dyeing process as the initial dyeing rate $K_{0,n}$ specifically as follows:

In order to obtain a more initial dyeing rate, in the early stage of dyeing, that is 2 min before dyeing, the data points taken are half of the data points in the whole dyeing process. Since the sampling interval of the first 2 min is too close to fast sample, and considering that the change of the dye solution after sampling is negligible, 6 groups of parallel dying experiments are set up with 6 points taken from each group, taking 800 μL each time with a pipette gun and repeating the above experiments three times. Through the dyeing process curve of the three experiments tested by Raman spectroscopy, the average value is calculated at each time point, and the averaged dyeing rate curve is finally obtained as shown in FIG. 1, and nonlinear fitting is carried out on the dyeing process curve at the fixed point (0,0), so that the slope of the zero point is obtained as the initial dyeing rate $K_{0,n}$. The calculation shows that: the initial dyeing rates of Reactive Red 3BE and Reactive Blue M-2G are respectively 28.10 mg·g$^{-1}$·min$^{-1}$ and 36.63 mg·g$^{-1}$·min$^{-1}$.

(3) configure the same mixed dye solution of Reactive Red 3BE and Reactive Blue M-2G, and calculate the real-time addition amount in $m_{r,n}$ (g) of Reactive Red 3BE and Reactive Blue M-2G, the calculation formula is:

$$m_{r,n} = TX\left[C_n\left(P - \frac{K_{0,1}t}{6\times10^4} - \frac{K_{0,2}t}{6\times10^4} - \ldots - \frac{K_{0,n}t}{6\times10^4}\right)/\rho_0 + \frac{K_{0,n}t}{6\times10^4}\right];$$

wherein $C_n$ is an initial concentration of the dye solution, $K_{0,n}$ is the initial dyeing rate of each dye with unit of mg·g$^{-1}$·min$^{-1}$, and n=2, which is the number of dye types; $K_{0,1}$ is the initial dyeing rate of Reactive Red 3BE with unit of mg·g$^{-1}$·min$^{-1}$, and the value is 28.10 mg·g$^{-1}$·min$^{-1}$; $K_{0,2}$ is the initial dyeing rate of Reactive Blue M-2G with unit of mg·g$^{-1}$·min$^{-1}$, and the value is 36.63 mg·g$^{-1}$·min$^{-1}$; $\rho_0$ is a density of an initial pad dyeing solution with unit of g/mL, and the value is 1.048 g/mL; P is a solution carrying rate of the fabric with unit of %, and the value is 74%; t is a time of fabric dipping in the pad dyeing solution with unit of s, and the value is 6 s; T is a time of pad dyeing with unit of min, and the value is 0.1 min; X is a weight of pad dyeing fabric per unit time with unit of g/min, and the value is 30 g/min.

For color combination pad dyeing cloth pieces, after each piece was pad dyed, the dye solution is recovered, the volume of the dye solution to be added is 2.15 mL, the mass of Reactive Red 3BE and Reactive Blue M-2G to be added is 13.80 mg and 16.36 mg respectively, and the concentration of each dye to be added is 6.42 g/L and 7.61 g/L respectively.

Figure 2:
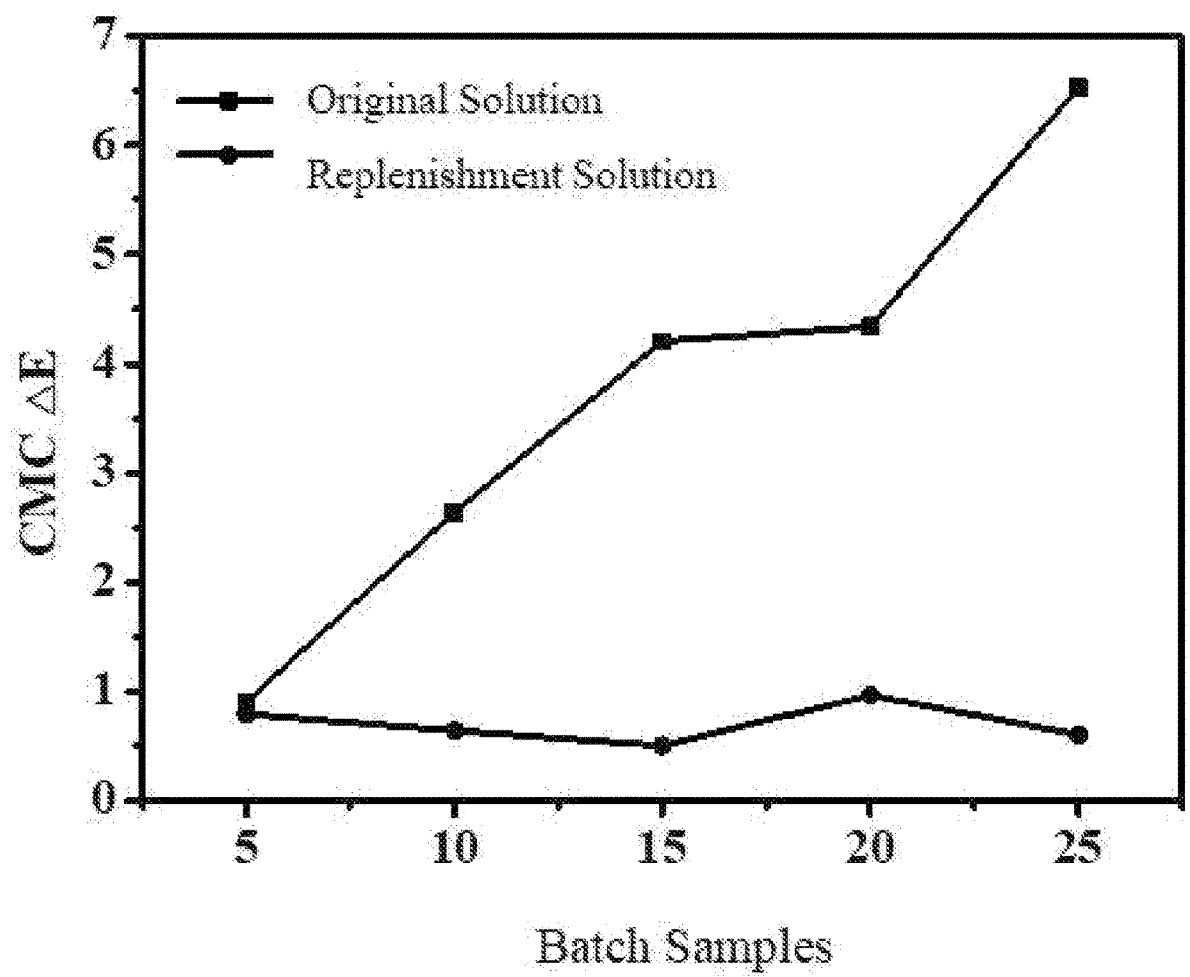
FIG. 2 is a comparison graph of the color difference of the batch sample fabric in Example 1 between the original dye solution and the dye solution after calculating the concentration of the replenishment solution.

The concentrations of the dye solutions are tested after each group of the dye solution pad dyeing 5, 10, 15, 20 and 25 pieces of fabric respectively. Using the concentration of the original dye solution as the concentration of the replenishment solution and repeating the above experiment, after five groups of comparison, the changes in the concentration of each dye and in the corresponding color difference of the fabric between the original dye solution and the dye solution after calculating the concentration of the replenishment solution are respectively shown in FIG. 1 and FIG. 2.

Example 2

A digital control system for solution replenishment system in the pad dyeing process with combination dyes, includes an automatic calculation $K_{0,n}$ value unit, a central processing unit and a replenishment pump; the automatic calculation $K_{0,n}$ value unit transmits the $K_{0,n}$ value from the sensor III to the central processing unit, calculates the replenishment amount through the central processing unit, and controls the replenishment pump to replenish the solution. The automatic calculation $K_{0,n}$ value unit is composed of a dye solution concentration detection instrument, a sensor I and a BP neural network model; wherein the dye solution concentration detection instrument is the Raman spectrometer, the spectrophotometer or the liquid chromatograph; the central processing unit is composed of a sensor II and a calculation processing unit.

The digital control system for solution replenishment system in the pad dyeing process with combination dyes is used in the during the color combination pad dyeing process in Example 1, and the specific steps are as follows:

(1) the value of each dye (the initial dyeing rate of each dye on the fabric per unit mass in the dyeing process) in multiple historical dye formulas is detected by Raman spectroscopy, and the historical dye formulas include two dyes (Reactive Red 3BE and Reactive Blue M-2G), taking one of the historical dye formulas as an example: first according to a historical dye formula, preparing 5 g/L of mixed dye solution of Reactive Red 3BE and Reactive Blue M-2G mixed dye solution (with mass ratio of 1:1) and 60 g/L of sodium sulfate, place the cotton fabric in the mixed dye solution for color combination dyeing, control the bath ratio of 1:25, and the dyeing temperature of 40° C.; calculating the amount of each dye on a fabric per unit mass according to the concentration of each dye at different dyeing times in the dye solution; drawing fitting curves of each dye amount-time on the fabric per unit mass calculated from the concentration of each dye at different dyeing times, the correlation coefficient of the dyeing amount-time fitting curve is not less than 0.90, and finally, performing first-order derivative processing of the dyeing amount-time fitting curve to obtain the slope of the dyeing amount-time fitting curve at the moment of 0, to obtain the $K_{0,n}$ value of each dye in the dye formula. Sequentially performing the above operations on multiple historical dye formulas to obtain the $K_{0,n}$ value of each dye in multiple historical dye formulas;

(2) the amount of each dye on the fabric per unit mass calculated from the concentration of each dye at different dyeing times in multiple historical dye formulas and its corresponding $K_{0,n}$ value constitute the dye database, and the amount of each dye on the fabric per unit mass calculated from the concentration of each dye at different dyeing times in multiple historical dye formulas in the dye database and its corresponding $K_{0,n}$ value are used as input and output items respectively to train the neural network model, and the trained BP neural network model is obtained; the termination condition of the training is: the proportion of the number of the training samples identified by the error accounts for no more than 5% of the total number of the training samples, and the training samples identified by the error refers to the training samples whose $K_{0,n}$ values output by the BP neural network model are inconsistent with the actual values;

(3) input the amount of each dye on the fabric per unit mass calculated from the concentration of each dye at different dyeing times in the dye formula of Reactive Red 3BE and Reactive Blue M-2G into the trained BP neural network model, which outputs the $K_{0,n}$ value of each dye; transmit the $K_{0,n}$ value of each dye from the sensor III to the central processing unit, and the real-time addition amount $m_{r,n}$ of each dye is calculated by the calculation formula in the digital control method of the solution replenishment system in the calculation processing unit, and finally, the addition amount of each dye is accurately controlled by the replenishment pump.

What is claimed is:

1. A digital control method for a solution replenishment system in a pad dyeing process with combination dyes, comprising: accurately calculating a real-time addition amount of each dye in the solution replenishment system in a whole dyeing process based on an initial dyeing rate of each dye, and replenishing a dye solution according to the real-time addition amount;
wherein during the color combination pad dyeing process, an initial dyeing time of fabric dipping in the dye solution is 4s-6s, a dyeing rate $K_{0,n}$ of each dye remains unchanged in the initial dyeing time, $K_{0,n}$ is an initial dyeing rate of an n-th dye in the dyeing process, n≥1, and a number of dye types ≥2, the time of the fabric dipping the dye solution in the pad dyeing tank is t, and an amount of the dye $m_{t,n}$ adsorbed to the fabric per unit gram at t is:

$$m_{t,n} = \frac{t}{60} \times K_{0,n};$$

in the formula, a unit of $m_{t,n}$ is mg·g$^{-1}$; a unit of t is s; a unit of $K_{0,n}$ is mg·g$^{-1}$·min$^{-1}$;
wherein a calculation method of the initial dyeing rate $K_{0,n}$ of each dye comprises the following steps: through a Raman spectrometer, a spectrophotometer or a liquid chromatograph, detecting changes of a concentration of each dye in a formula dye solution along with a dyeing time under color combination dyeing conditions, calculating the amount of each dye on a fabric per unit mass according to the concentration of each dye at corresponding dyeing times in the dye solution, drawing a curve graph of the dyeing process, and obtaining a slope of a zero point from the fitted curve graph of the dyeing process as the initial dyeing rate $K_{0,n}$;

in the pad dyeing process, after dyeing for T time, the amount of the dye $m_{T,n}$ adsorbed to the fabric is:

$$m_{T,n} = m_{t,n} \times T \times X;$$

in the formula, X is a weight of the dyed fabric per unit time; a unit of $m_{T,n}$ is g; a unit of T is min; a unit of X is g/min;

$$L_r = L_p;$$

in the formula, $L_r$ is a volume of the replenishment solution with unit of mL; $L_p$ is a volume of the dye solution rolled onto the fabric through pad dyeing with unit of mL;

$$m_{r,n} = m_{p,n} + m_{T,n};$$

in the formula, $m_{T,n}$ is a mass of the n-th component dye that needs to be added after dyeing for T time with unit of g; $m_{p,n}$ is a mass of the n-th component dye that rolled onto the fabric by a roller after dyeing for T time with unit of g;

$$m_{r,n} = TX\left[C_n\left(P - \frac{K_{0,1}t}{6\times10^4} - \frac{K_{0,2}t}{6\times10^4} - \ldots - \frac{K_{0,n}t}{6\times10^4}\right)/\rho_0 + \frac{K_{0,n}t}{6\times10^4}\right];$$

wherein $C_n$ is an initial concentration of each dye in the dye solution with unit of g/mL; $\rho_0$ is a density of an initial pad dyeing solution with unit of g/mL; P is a solution carrying rate of the fabric with unit of %;
wherein the accuracy refers to real-time addition grams of each dye in the combination dyes.

2. The digital control method of claim 1, wherein the initial dyeing rate of each dye is calculated on a same basis as the conditions of the pad dyeing process, wherein dye types, a concentration and proportion of dye solution, a dyeing temperature, a bath ratio, and an amount of additives are same.

3. The digital control method of claim 1, wherein the pad dyeing process with combination dyes comprises a pad dyeing process of acid dyes, reactive dyes, or direct dyes.

4. The digital control method of claim 1, wherein the pad dyeing process with combination dyes refers to a pad dyeing process with combination of more than two dyes.

5. The digital control method of claim 4, wherein the pad dyeing process with combination dyes is a process of continuously applying the dye solution to the fabric by a padder.

6. The digital control method of claim 1, wherein the initial concentration $C_n$ of the dye solution is 0.01 g/L-200 g/L; wherein a dyeing temperature is 10° C.-100° C., and wherein the dye solution further contains an amount of neutral salt, and the amount of neutral salt in the dye solution is 0 g/L-300 g/L.

* * * * *